United States Patent [19]

Yoon

[11] Patent Number: 6,061,437

[45] Date of Patent: May 9, 2000

[54] DATA SEARCH METHOD IN KEY TELEPHONE SYSTEM

[75] Inventor: Yong-Sik Yoon, Kyongsangbak-do, Rep. of Korea

[73] Assignee: SamSung Electronics Co., Ltd., Kyungki-do, Rep. of Korea

[21] Appl. No.: 09/016,352

[22] Filed: Jan. 30, 1998

[30] Foreign Application Priority Data

Jan. 30, 1997 [KR] Rep. of Korea .................. 97-2759

[51] Int. Cl.[7] .................................................. H04M 1/00
[52] U.S. Cl. ..................... 379/156; 379/156; 379/157; 379/164; 379/165; 379/115
[58] Field of Search ................................. 379/156, 157, 379/164, 165, 115

[56] References Cited

U.S. PATENT DOCUMENTS

| | | | |
|---|---|---|---|
| 4,410,765 | 10/1983 | Hestad et al. ................ | 179/7.1 R |
| 4,633,393 | 12/1986 | Rundell ........................ | 379/200 |
| 5,425,085 | 6/1995 | Weinberger et al. ......... | 379/112 |
| 5,452,351 | 9/1995 | Yamamoto .................... | 379/221 |
| 5,481,604 | 1/1996 | Minot ........................... | 379/221 |
| 5,546,578 | 8/1996 | Takada ......................... | 395/600 |
| 5,623,540 | 4/1997 | Morrison et al. ............. | 379/115 |
| 5,638,433 | 6/1997 | Bubien, Jr. et al. ........... | 379/130 |
| 5,748,717 | 5/1998 | Chan et al. ................... | 379/120 |
| 5,793,852 | 8/1998 | Kang et al. ................... | 379/115 |
| 5,884,304 | 3/1999 | Davis, III et al. ............ | 707/4 |

*Primary Examiner*—Curtis A. Kuntz
*Assistant Examiner*—Quoc Tran
*Attorney, Agent, or Firm*—Robert E. Bushnell, Esq.

[57] ABSTRACT

A key telephone system with a database dynamically sets a least cost route based on an access frequency distribution value of the database. For that purpose, the key telephone system evaluates access frequency distribution values of records in the database, indexes the records in order of the access frequency distribution value, and creates an index table. Then, the key telephone system searches the database based on the index table by a binary searching. The index table is a digit comparison table.

5 Claims, 2 Drawing Sheets

DATA SEARCH METHOD IN KEY TELEPHONE SYSTEM

CLAIM OF PRIORITY

This application makes reference to, incorporates the same herein, and claims all benefits accruing under 35 U.S.C §119 from an application entitled Data Search Method In Key Telephone System earlier filed in the Korean Industrial Property Office on Jan. 30 1997, and there duly assigned Ser. No. 97-2759 by that Office.

BACKGROUND OF THE INVENTION

1. Field of the Invention

The present invention relates to a key telephone system, and in particular, to a method for reducing a search time of a database to quickly set a least cost route.

2. Description of the Related Art

A key telephone system commonly employs a technique for reducing the communication cost, such as a least cost route (hereinafter, referred to as "LCR"). In order to perform the LCR function, a database should be built upon a close examination of traffic intensity and the communication networks surrounding the operating site. In general, however, it takes a long time to search the LCR-related database, which results into a deterioration of the system performance. Hence, there is proposed a binary search method for sorting all records in advance when building the database, to reduce a search time of the database. However, in case of an overload due to heavy traffic, the binary searching also takes a long search time, which causes a hinderance to a real-time service. Accordingly, there is a demand for developing an advanced searching algorithm.

Out of the LCR-related databases, a DCT (Digit Comparison Table) database (which is a sort of a buffer table into which dialed digits are piled up) is most closely related to the search time of the database. The DCT database has hundreds of numerical strings programmed therein. A delay of the search time has a great influence particularly on the performance of a system which manages the calls using a main processor only, without a separate signal processor. The key telephone system employs a table search method consisting of an insertion sort algorithm and the binary search algorithm, to reduce the search time. The insertion sort algorithm is used to build the database, and is the most simple one of the known sort algorithms. The insertion sort algorithm compares the records in sequence from the beginning to search an exact position of the records, so as to register a new record into the DCT database or delete the pre-registered records. The binary search algorithm builds an index table having key values corresponding to the respective records, and compares a record K with a key value Ki at the middle of the table. In such a case, the following three conditions will occur.

1) K<Ki [Ri, Ri+1, . . . Rn are the records excepted from the search]
2) K=Ki [Search Completion]
3) K>Ki [R1, R2, . . . Ri are the record excepted from the search]

In this manner, the searching is repeated until a desired record is searched. The number of the comparisons is evaluated based on $\log_2 N$, where N represents the number of records.

A medium to large sized key telephone system having the LCR function has a system monitoring cycle of about 100 msec. In case of heavy traffic, the system may be overloaded because it takes a long time to manage a great number of calls. Thus, the system may operate undesirably at low speed, lowering the system performance. Here, the increased search time results into an extension of the system monitoring cycle, thereby causing a deterioration of the system performance. When a frequently accessed record (i.e., a record with a higher access frequency) is located at a place of the digit comparison table where the record can be searched by many searching times, the searching for this record has a great influence on the system performance. If the time required for searching 500 records by the binary searching is Tms, the search time for the corresponding record is about 9×Tms, and the search time continues to influence the system as long as the place of the DCT record is not changed. This is because the records with a very low access frequency are all included in the index table, maintaining the constant record number N. Thus, the key telephone system undesirably compares the unnecessary records with the lower access is frequency, increasing the search time. A switching system managing the calls in a time-sharing basis has an overhead of 9Tms for every call management operation. If 30 subscribers attempt to make calls simultaneously, the whole system monitoring cycle increases up to 30×9 Tms. Thus, the subscriber who is allocated finally is serviceable after a time delay of (monitoring cycle)+(30−1)×9 Tms. If Tms=2 ms, the overhead time becomes 29×18 ms=522 ms, and the service is delayed by the overhead time of 522 ms, which results into a deterioration of the system performance. Such an overhead problem can not be solved by the conventional binary searching method.

Examples of uses of least cost routing systems are further described in: U.S. Pat. No. 4,410,765 to Alfred M. Hestad et al. entitled Telephone Call Routing And Charging System; U.S. Pat. No. 5,425,085 to Gerald J. Weinberger et al. entitled Least Cost Routing Device For Separate Connection Into Phone Line; U.S. Pat. No. 5,452,351 to Keiji Yamamoto entitled Electronic Private Branch Exchange Having An LCR Function And A Method Of Accessing A Particular Common Carrier In That Exchange; and U.S. Pat. No. 5,638,433 to Walter J. Bubien, Jr. et al. entitled Best Rate Telecommunication Access Code And Data Transceiver/Facilitator (BRFT).

SUMMARY OF THE INVENTION

It is therefore an object of the present invention to provide a data search method for setting a least cost route based on an access frequency distribution value.

It is another object of the present invention to provide a data search method for dynamically searching records.

To achieve these and other objects, a data search method for setting a least cost route in a key telephone system including a database includes the steps of evaluating access frequency distribution values of records in the database; indexing the records in order of the access frequency distribution values, and creating an index table; and searching the database based on the index table by a binary searching. Here, the index table is a digit comparison table.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with reference to the attached drawings. Further, it should be clearly understood by those skilled in the art that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 1:
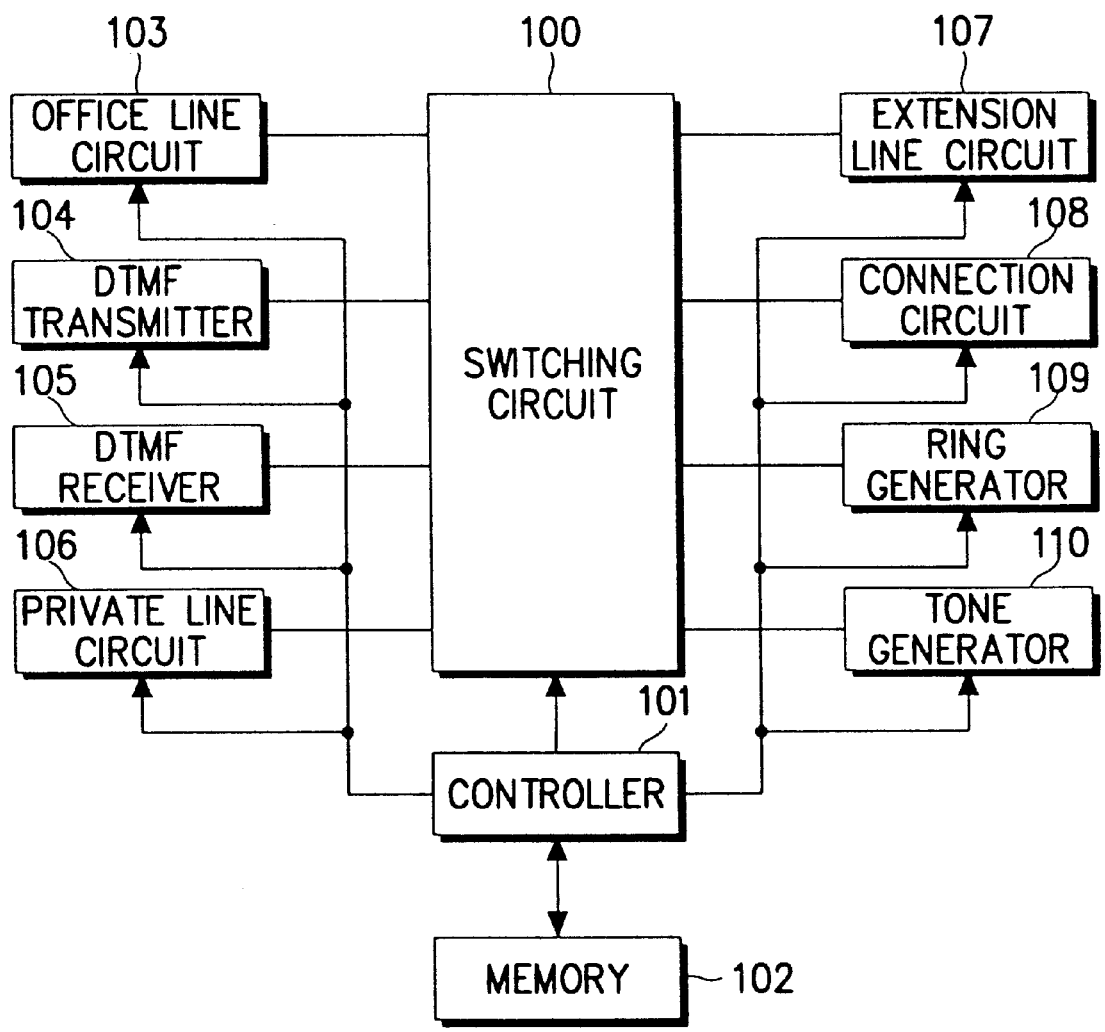
FIG. 1 is a schematic block diagram of a key telephone system to which the present invention is applicable.

FIG. 1 illustrates a key telephone system to which the present invention is applicable. As illustrated, a controller 101, including record access counter, controls an overall operation of the key telephone system according to a control program. A memory 102 stores the control program of controller 101, stores a digit comparison table and stores numbers for a plurality of extension lines. A switching circuit 100 switches a calling subscriber's terminal (i.e., telephone) of an office line circuit 103 or of an extension line circuit 107 to a called subscriber's terminal, under the control of controller 101. Office line circuit 103 connects a number of office lines and private lines incoming from an office exchange (not shown) to switching circuit 100, under the control of controller 101. Extension line circuit 107 converts a DTMF (Dual Tone Multi-Frequency) signal received from a calling extension line subscriber's terminal via switching circuit 100 into digital dual tone multi-frequency (DTMF) data, and transfers the digital DTMF data to a DTMF transmitter 104 via switching circuit 100, under the control of controller 101. A ring generator 109 generates a ring signal and transfers the ring signal to the called subscriber's terminal to notify the called subscriber of an incoming telephone call, upon receiving a call request to a particular extension line terminal from the terminals of office line circuit 103 or the extension line circuit 107, under the control of controller 101. A tone generator 110 generates various kinds of tone signals according to the control of controller 101, and provides the switching circuit 100 with the generated tone signals.

Figure 2:
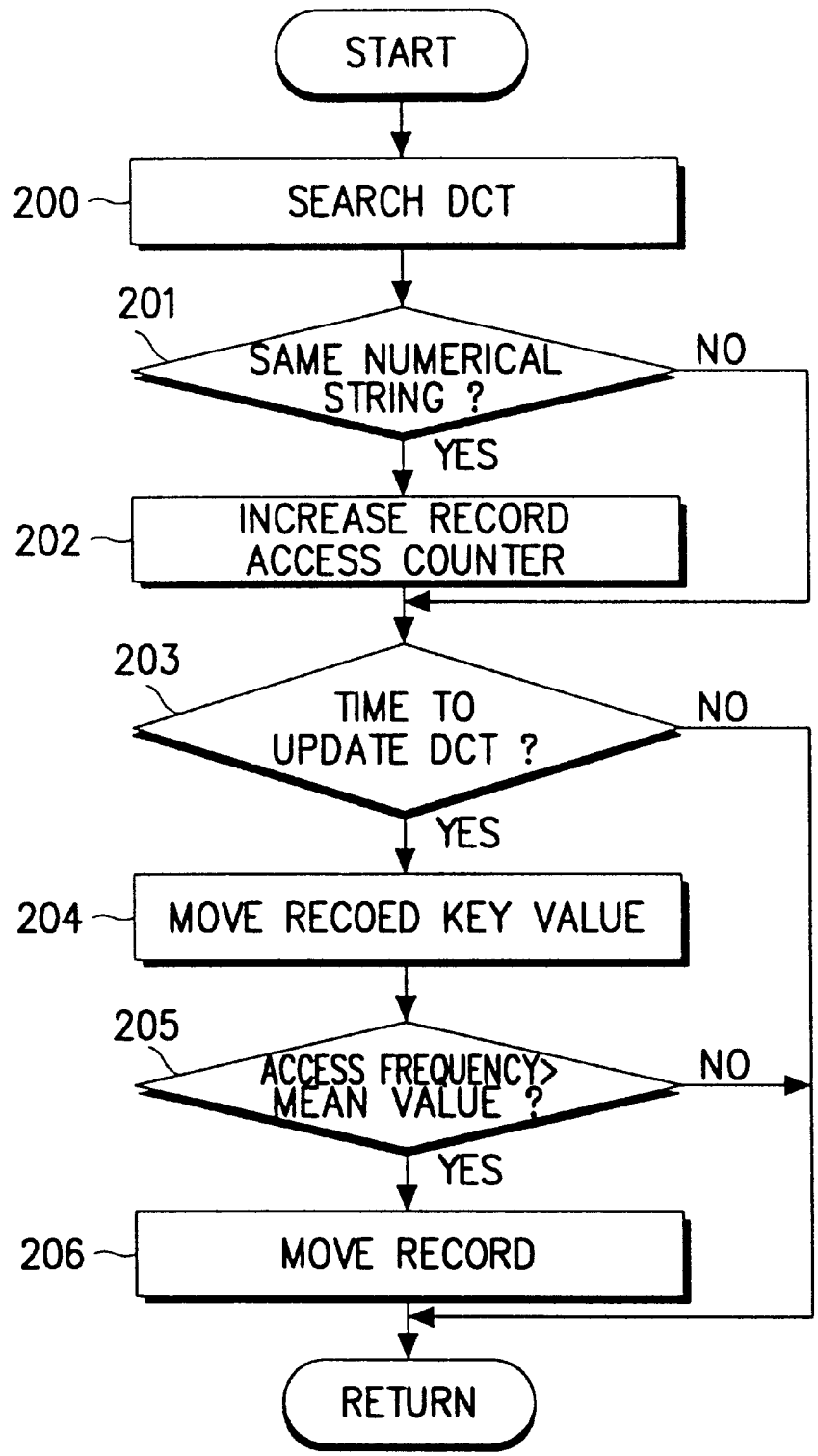
FIG. 2 is a flow chart for showing a data search method of the key telephone system according to an embodiment of the present invention.

FIG. 2 illustrates a data search method of the key telephone system according to an embodiment of the present invention. With reference to FIGS. 1 and 2, the search process starts as a calling subscriber dials a telephone number for a called subscriber, and controller 101 searches the digit comparison table DCT at step 200, and checks, at step 201, by the binary searching method, whether the digit comparison table DCT has a numerical string that is the same as numerical string the calling subscriber has dialed. If the digit comparison table DCT has the same numerical string, controller 101 increases the record access counter at step 202. Then, at a step 203, controller 101 checks by using an internal clock, whether it is time to update the digit comparison table DCT. If it is a time to update the digit comparison table DCT, controller 101 reads time data from the internal clock and moves a record key value to a time zone having the least traffic, at step 204. The user may change the time zone at his/her discretion.

At step 205, controller 101 analyzes an access frequency distribution value, to evaluate a mean value of the access number of the whole records, based on the access number of the respective records. As the result, only the records having an access frequency value above the mean value are moved to a new digit comparison table, at a step 206. Thereafter, the records thus moved are deleted from the old digit comparison table, the record access counter is initialized, and the process returns to start again when a calling subscriber dials a number.

In the light of the foregoing descriptions, the preferred embodiment of the present invention dynamically operates the database based on the access frequency distribution value to reduce the search time. That is, the invention is based on the fact that the more the digit comparison table with the record key value decreases in size, the more the search time is reduced. Actually, the respective records in the database have different access frequencies, so that the record access distribution leans toward particular records. The invention excepts the records having the lower access frequency from the initial searching to reduce the size of the record index table, i.e., digit comparison table, so as to reduce the search time of the database. If the frequently accessed records only are first searched, the relative index (digit comparison) table decreases in size. Thus, the number of compositions may be reduced as much as the number of records that are excepted from the index table. Further, when the record with the higher access frequency is located at a place where the record can be searched by many times of the comparisons, the record is registered in the new index table and removed from the existing index table. Although the key values of the records are separately managed, the whole size of the index table is not changed. Further, since the record access distribution value also varies according to the surrounding communication networks, a switching program analyzes, at regular periods, the record access distribution value to create the new index table of the digit comparison table and to delete records from the existing index table.

As can be appreciated from the foregoing descriptions, the key telephone system according to the present invention regularly updates the database to automatically provide an optimal database on any condition of the operating site. Therefore, it is possible to search for a desired record with a minimum number of comparisons being required, thereby quickly setting the least cost route (LCR) within the reduced search time.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A data search method for setting a least cost route in a key telephone system including a database, comprising the steps of:

evaluating access frequency distribution values of records in the database;

indexing the records in order of said access frequency distribution value, and creating an index table; and searching the database based on said index table, by a binary searching method, for a desired record with a minimum number of comparisons being required, thereby quickly setting the least cost route within a reduced search time.

2. A data search method according to claim 1, wherein said index table is a digit comparison table.

3. A database search method in a key telephone system, said method comprising the steps of:

searching a first index in a digit comparison table of stored numbers for a number dialed by a subscriber as said subscriber dials said number, each of stored numbers including an access frequency variable which is increased by one each time said stored number is dialed during a predetermined period;

increasing a record access counter when said number matches one of said stored numbers in said digit comparison table and increasing the access frequency variable of said one of said stored numbers;

determining whether a time has occurred for updating said digit comparison table;

calculating a mean value of all of said access frequency variables when it is determined that said time for updating has occurred;

comparing each of said access frequency variable to said mean variable for determining which of said stored numbers has an access frequency variable above said mean value;

updating said digit comparison table by creating a second index in said digit comparison table and moving each stored telephone number having an access frequency variable greater than said mean variable, as a result of said comparing step, from said first index to said second index, said second index being searched first for a number dialed by a subscriber after said updating step.

4. A key telephone system comprising:

a switching circuit for connecting calls between terminals of an office line circuit and an extension line circuit, said extension line circuit being connected to a plurality of subscriber terminals;

a controller, including record access counter, for controlling said switching circuit and for controlling an overall operation of said key telephone system according to a control program; and a memory for storing said control program, said memory comprising a first index table of stored numbers searchable by said controller in response to a dialing operation by one of said subscriber terminals;

said controller searching said first index table of stored numbers for a number dialed by said one of said subscriber terminals as said number is dialed, each of stored numbers including an access frequency variable which is increased by one each time said stored number is dialed during a predetermined period;

said controller increasing said record access counter when said number matches one of said stored numbers in said index table and increasing the access frequency variable corresponding to said one of said stored numbers;

said controller determining whether a time has occurred for updating said first index table;

said controller calculating a mean value of all of said access frequency variables when it is determined that said time for updating has occurred;

said controller comparing each of said access frequency variable to said mean variable for determining which of said stored numbers has an access frequency variable above said mean value;

said controller updating said first index table by creating a second index table and moving each stored telephone number having an access frequency variable greater than said mean variable, as a result of said comparing step, from said first index table to said second index table, said second index being searched first for a number dialed from one of said subscriber terminals after said updating has occurred.

5. The key telephone system as set forth in claim 4, said first and second index tables comprising a digit comparison table.

* * * * *